(12) United States Patent
Okura et al.

(10) Patent No.: US 7,572,040 B2
(45) Date of Patent: Aug. 11, 2009

(54) LIGHTING DEVICE

(75) Inventors: Susumu Okura, Tokyo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/034,808

(22) Filed: Jan. 14, 2005

(65) Prior Publication Data

US 2005/0192726 A1 Sep. 1, 2005

(30) Foreign Application Priority Data

Feb. 27, 2004 (JP) .............................. 2004-054597

(51) Int. Cl.
*F21V 21/28* (2006.01)

(52) U.S. Cl. .................... 362/465; 362/466; 362/469

(58) Field of Classification Search ......... 362/465–467, 362/469

See application file for complete search history.

(56) References Cited

U.S. PATENT DOCUMENTS 5,877,680 A * 3/1999 Okuchi et al. ............... 340/468
6,305,823 B1 * 10/2001 Toda et al. .................. 362/276
6,450,673 B1 * 9/2002 Toda et al. .................. 362/465
6,729,749 B2 * 5/2004 Kondo et al. ................ 362/466
6,942,369 B2 * 9/2005 Le Bars et al. .............. 362/464

FOREIGN PATENT DOCUMENTS

| DE | 19908482 A1 | 9/2000 |
|---|---|---|
| DE | 69710661 T2 | 8/2002 |
| JP | 11-91436 A | 4/1999 |
| JP | 11-91437 A | 4/1999 |

\* cited by examiner

*Primary Examiner*—Jacob Y Choi
*Assistant Examiner*—Robert May
(74) *Attorney, Agent, or Firm*—Birch, Stewart, Kolasch & Birch, LLP

(57) ABSTRACT

An optical axis control assembly is provided with a plurality of control means which are supplied with information necessary for deciding the tilt angle of the car body 1, and determine the body tilt angle by sharing the input information with the other control means; and optical axis control means for controlling the optical axis of each headlight based on the determined body tilt angle. By the combined use of a plurality of low-cost, small control devices of the same specifications each of which is incapable of determining the body tilt angle by itself because of a lack of information, the optical axis control device assembly exerts the function of determining the body tilt angle, and effects the optical axis control of the headlights based on the determined body tilt angle.

12 Claims, 5 Drawing Sheets

CORRECTION $$\text{TILT ANGLE} = \tan^{-1}\left(\frac{\Delta H}{L}\right)$$

US 7,572,040 B2

LIGHTING DEVICE

BACKGROUND OF THE INVENTION

1. Field of the Invention

The present invention relates to an optical axis control assembly for headlights at the front of a vehicle.

2. Description of the Related Art

Conventionally, two electronic control units of the same configuration are used to control lighting of HID or similar discharge lamps mounted as headlights of a vehicle at the front thereof as disclosed in Japanese Pat. Appln. Kokai Pub. No. 91436/99 and Japanese Pat. Appln. Kokai Pub. No. 91437/99. The one electronic control unit having connected thereto various sensors works as a main electronic control unit, which computes a controlled variable of each discharge lamp in the direction of its optical axis and sends the computed value to the other electronic control unit to control the optical axes of the right and left discharge lamps in equal proportion. In this way, two electronic control units of the same function are used to appropriately control the optical axes of the right and left discharge lamps at the front of the vehicle without causing any deviation from each other.

The conventional optical axis control scheme uses, as mentioned above, electronic control units capable of controlling the optical axes of the right and left discharge lamps independently of each other, but since full information for computing the tilt angle of the car body is input to only one of the two electronic control units, constituent elements of the other electronic control unit for optical axis determination are totally useless.

The provision of such useless constituent elements, which are not actually used for receiving information, such as a connector and similar parts, inevitably raises the cost of the electronic control assembly, and unnecessarily consumes space due to the magnification of the electronic control unit, impairing the utilization efficiency of limited space of the car body.

SUMMARY OF THE INVENTION

It is therefore an object of the present invention to provide a low-cost, unbulky headlight optical axis control assembly which computes the body tilt angle and exerts the optical axis control function by the combined use of a plurality of low-cost, small-sized control devices of the same specifications but each incapable of effecting optical axis control by itself because of a lack of information.

The optical axis control assembly according to the present invention is provided with: a plurality of control means supplied with information necessary for deciding the tilt angle of the car body, by sharing the input information; and optical axis control means for control the optical axis of each of the headlamps based on the decided tilt angle.

Since the plurality of control means are supplied with information necessary for determining the body tilt angle and determine the body tilt angle by using the input information in common to the plural control means, and since the optical axis control means controls the optical axis of each headlight based on the determined body tilt angle, the combined use of low-cost, small-sized control devices, each incapable of optical axis control because of a lack of information, enables the body tilt angle to be determined and permits reduction of manufacturing costs and downsizing of the devices, thereby to raise the efficiency of space utility.

DETAILED DESCRIPTION OF THE PREFERRED EMBODIMENTS

Embodiment 1

Figure 1:
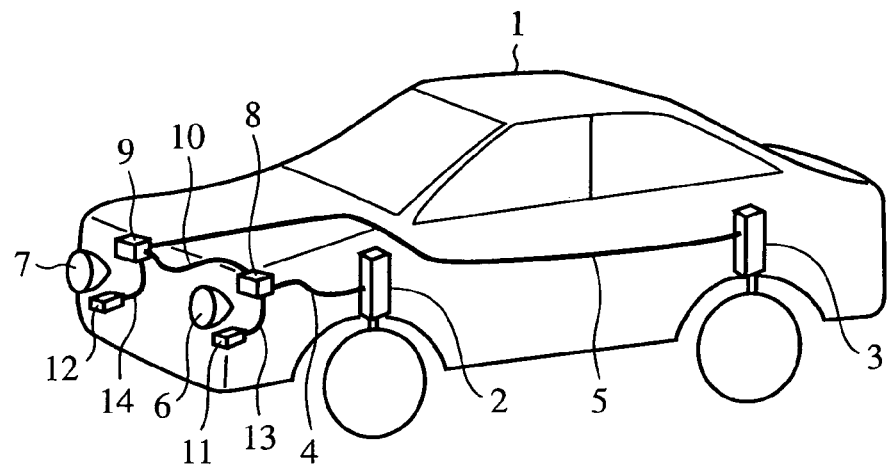
FIG. 1 is a perspective view of a vehicle loaded with headlight optical axis control assembly according to the present invention.

FIG. 1 is a perspective view of a vehicle loaded with the optical axis control assembly for headlights according to the present invention. Disposed in the car body 1 at the forward and backward positions thereof are vehicle's height sensors 2 and 3 for detecting variations in the height of the car body. The vehicle's height sensors 2 and 3 are connected via signal lines 4 and 5 to optical axis control devices 8 and 9 each equipped with a discharge lamp lighting function, which are disposed as control means in close proximity to discharge lamps (such as HID lamps) 6 and 7 disposed as headlights at the front of the car body 1 on the right and left sides thereof. The optical axis control devices 8 and 9 are interconnected via a signal line 10 to exchange information between them, and at the same time they are connected via signal lines 13 and 14 to levelizer actuators 11 and 12 used as optical axis control means for headlights.

Figure 2:
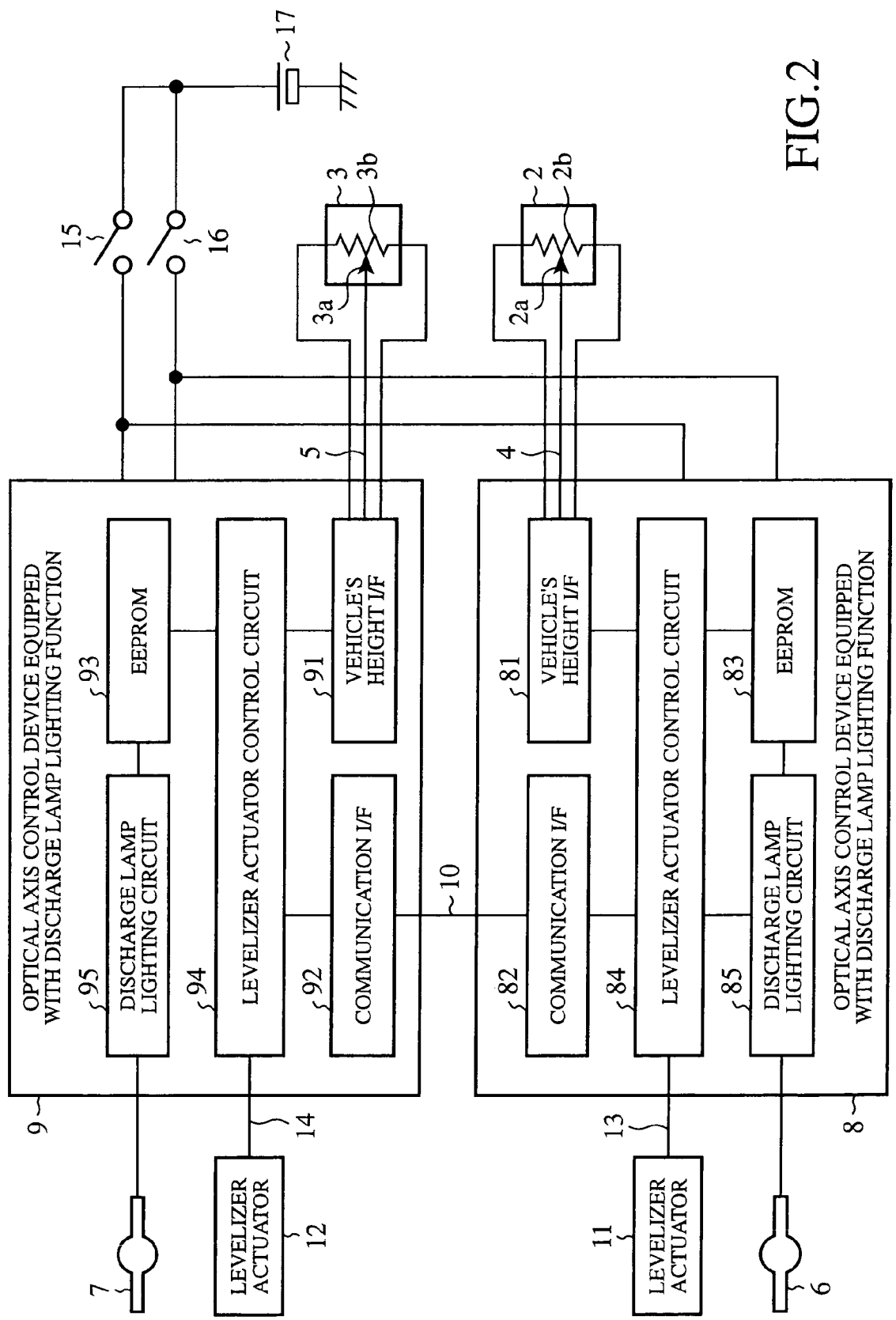
FIG. 2 is a block diagram showing the configuration of each of the optical axis control assembly equipped with a discharge lamp lighting function.

FIG. 2 illustrates in block form the configurations of the optical axis control devices 8 and 9, which are provided with: vehicle's height interfaces (hereinafter referred to as I/Fs) 81 and 91 connected via the signal lines 4 and to the vehicle's height sensors 2 and 3; communication I/Fs 82 and 92 connected to the signal line 10 to exchange information between them; EEPROMs 83 and 93 each having stored therein the distance between the vehicle's height sensors 2 and 3, their characteristics and initial values that differ among different car models; levelizer control circuits 84 and 94 that decide the tilt angle of the car body 1 based on the information from the vehicle's height I/Fs 81 91, the communication I/Fs 82, 92 and from the EEPROMs 83, 93, and control the levelizer actuators 11 and 12 accordingly; and discharge lamp lighting circuits 85 and 95 that control lighting of the discharge lamps based on the information respectively from the EEPROMs 83 and 93. The optical axis control devices 8 and 9 are connected to a lighting power supply 17 via a lighting switch 15 and high/low beam change-over switch 16.

The vehicle's height sensors 2 and 3 are formed, for example, by rotary variable resistors; the sliding positions of movable pieces 2a and 3a on stationary resistors 2b and 3b change with a change in the vehicle's height, and resistance values available from the movable pieces 2a and 3a change accordingly. The change in the resistance values corresponds to the change in the vehicle's height.

Now, a description will be given an example of how to attach the rotary resistors to the car body 1 as the vehicle's height sensors 2 and 3. A rotary arm is affixed to a movable shaft of each rotary variable resistor, then the variable resistor is attached to the car body 1 having supported thereto an axle shaft with a suspension spring interposed therebetween, and the axle shaft and the rotary arm are coupled by a coupling rod. The distance of the car body 1 to the axle shaft changes with the load on the car body 1, and the position of the movable piece of the rotary variable resistor on the stationary resistor changes in accordance with the change in the above-mentioned distance, and the resistance value available from the movable piece changes accordingly. Hence, by presetting the vehicle's height value corresponding to a variation in the resistance value, it is possible to obtain the vehicle's height from the variation in the resistance value.

Figure 3:
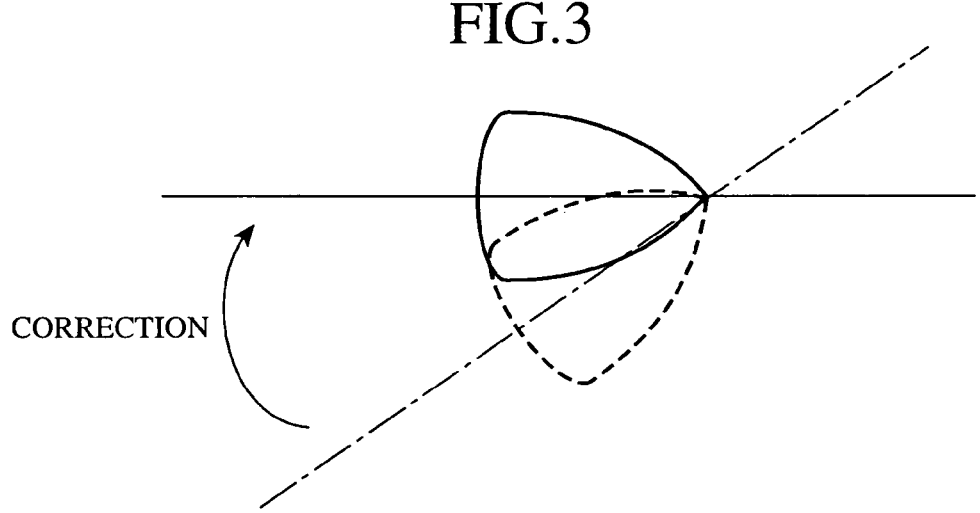
FIG. 3 is a diagram for explaining how to set the initial position of the optical axis.
Figure 4:
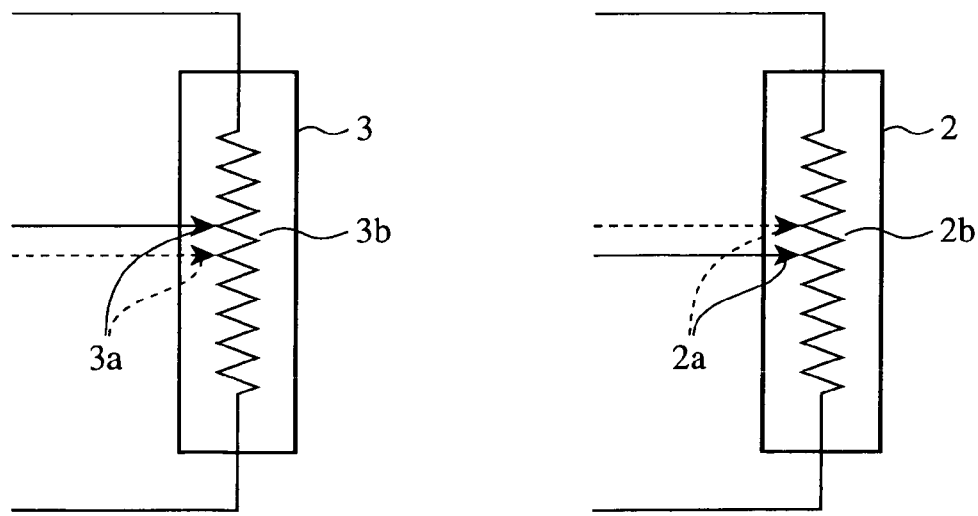
FIG. 4 is a diagram for explaining how to set the initial position of the optical axis.

As shown in FIG. 4, the movable pieces 2a and 3a of the rotary variable resistors attached to the car body 1 are not always positioned at the centers of the stationary resistors when they are installed in the car. In such an instance, the optical axis, which is decided based on the resistance values available from the movable pieces 2a and 3a, that is, based on the vehicle's height value, is oriented in the direction indicated by the broken line in FIG. 3, and hence it must be corrected for orientation in the direction indicated by the solid line. To avoid this, at the time of initialization described later on, if the movable pieces 2a and 3a of the variable resistors lie at the solid-line positions in FIG. 4, the optical axis control devices equipped with the discharge lamp lighting function are caused to recognize that the optical axis be corrected as indicated by the solid line in FIG. 3.

Next, the operation of this embodiment will be described below.

The levelizer control circuits 84 and 94 of the optical axis control devices 8 and 9 input thereto via the vehicle's height I/Fs 81 and 91 pre-allocated pieces of information from the vehicle's height sensors 2 and 3, respectively, and each levelizer control circuit sends the thus input information via the signal line 10 to the other levelizer control circuit and receives from the latter the information input thereto.

Figure 8:
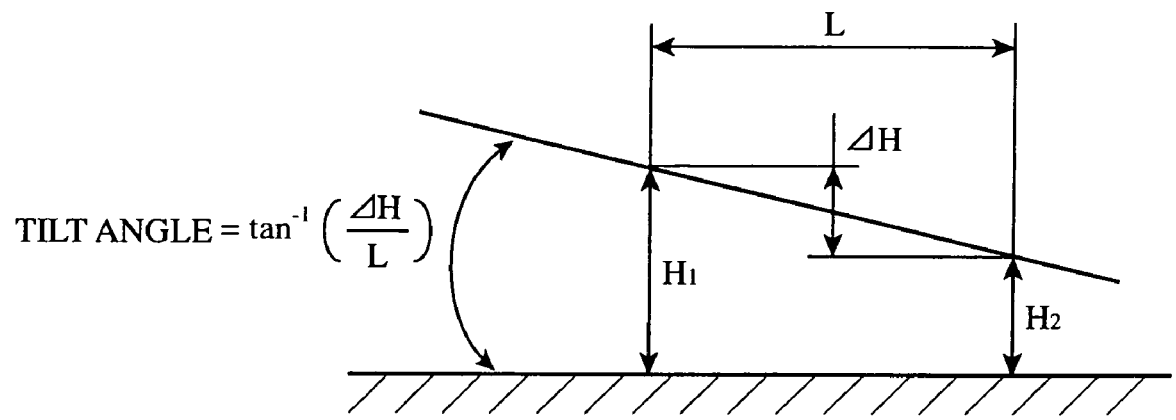
FIG. 8 is a diagram for explaining the computation of the body tilt angle.
Figure 9:
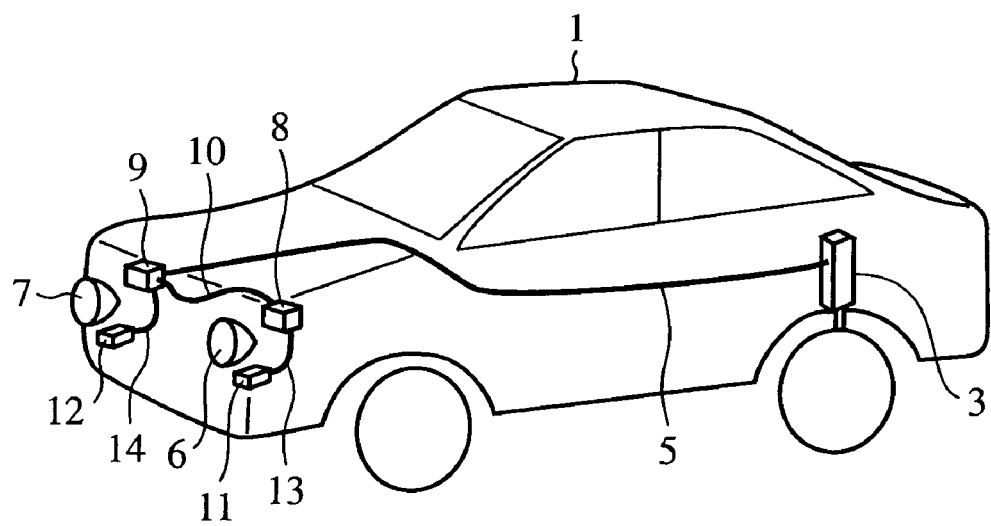
FIG. 9 is a perspective view of a vehicle illustrating another embodiment of the present invention.

Based on pieces of information H1 and H2 thus input thereto from the vehicle's height sensors 2 and 3 disposed at the forward and backward positions in the car body 1, the difference ΔH between the both pieces of information H1 and H2, and the distance L between the front and rear vehicle's height sensors 2 and 3, the levelizer control circuits 84 and 94 each calculate the car body tilt angle $\theta=\tan^{-1}(\Delta H/L)$ as shown in FIG. 8. The levelizer control circuits 84 and 94 use the thus calculated tilt angle θ to control the levelizer actuators 11 and 12 to thereby control the optical axes of the discharge lamps 6 and 7.

As described above, according to Embodiment 1, since the levelizer control circuits 84 and 94 provided in the right and left optical axis control circuits 8 and 9 input thereto pre-allocated pieces of information from the vehicle's height sensors 2 and 3, respectively, and exchange and use (share) the pieces of information fed from the vehicle's height sensors 2 and 3 input to the optical control devices, either of the optical axis control devices 8 and 9 need not be supplied with complete information for deciding the tilt angle of the car body 1 (the respective pieces of information from the vehicle's height sensors 2 and 3). Accordingly, it is possible to implement optical axis control for headlights by obtaining the tilt angle of the car body 1 with the optical axis control devices 8 and 9 of a small size having a discharge lighting function, each using a connector of fewer poles (a connector for only either one of the vehicle's height sensors 8 and 9) without a heavy concentration of wiring near either of the right and left discharge lamps. In other words, the optical axis control for the discharge lamps can be achieved by use of two simple-structured optical axis control devices 8 and 9 of the same specifications each having one I/F for either one of the front and rear vehicle's height sensors.

Besides, the present invention has such advantages as described below.

(1) To keep the vehicle's height sensors 2 and 3 at different constant values, their resistance values are preset at different values. With such setting, the application of a constant current from the levelizer control circuits 84 and 94 to the vehicle's height sensors 2 and 3 via the vehicle's height I/Fs 81 and 91 causes voltage drops across the vehicle's height sensors 2 and 3, by which it is possible to detect which of the optical axis control devices 8 and 9 is connected to which of the front and rear vehicle's height sensors, that is, it is possible to decide as to whether the optical axis control device connected to the vehicle's height sensor is used with the front or with rear sensor. Accordingly, there is no need for using a different optical axis control device equipped with a discharge lamp lighting function for each of the headlights—this permits reduction of the number of manufacturing steps.

(2) Since the optical axis control devices 8 and 9 are configured to exchange signals via the signal line 10, the number of connectors for signal line connection use is smaller than in the case of inputting signals to the respective optical axis control devices from outside, permitting efficient exchange of information with less wiring.

(3) Since the optical axis control devices 8 and 9 mounted on the car body 1 are configured to set information indicating as to which of the optical axis control devices is connected to which of the front and rear vehicle's height sensors 2 and 3, the optical axis control devices 8 and 9 can be formed under exactly identical specifications.

(4) Since the positions of the vehicle's height sensors 2 and 3 to be mounted on the car body 1 differ according to the car model, the distance between the vehicle's height sensors 2 and 3 also differ accordingly, and the vehicle's height and the sensor outputs also differ according to each particular vehicle type. To support such diverse requirements of individual car models, it is necessary, in the prior art, to prepare various kinds of optical axis control devices, corresponding in number to the car models concerned. According to the present invention, however, since the optical axis control devices 8 and 9 are configured to store, after their incorporation into the car body, the information necessary for the decision of the tilt angle of the car body, that is, information for each target model, such as the vehicle's height, the value detected and outputted from the vehicle's height sensors and also the distance between the front and rear vehicle's height sensors, the optical axis control devices of the same configuration can be used to effect optical axis control of headlamps which is well suited to a plurality of kinds of car models.

(5) The signal line 10 passes therethrough information while changing its voltage level; this signal line 10 may be shared with a manual setting signal line (an initialization switch in FIG. 5, described later on). An external actuation of this initialization switch to maintain the signal line, for example, at an L (low) level (short-circuit) for a predetermined time (3 to 5 seconds, for instance) can be decided as an initialization operation for bringing the optical axis back to its initial center direction.

(6) By presetting and prestoring various kinds of information which differ among car models, such as the distance between the vehicle's height sensors 2 and 3 and their characteristics and initial values, in the storage means built in the optical axis control devices 8 and 9, for example, EEPROMs 83 and 84, the stored contents can be maintained even after the devices are disconnected from batteries—this eliminates the inconvenience of having to reset the required information each time the devices are disconnected from the batteries.

(7) By prestoring the distance between the front and rear vehicle's height sensors and their output characteristics, for example, in ROMs of CPUs contained in the levelizer control circuits 84 and 94, it is possible to read out therefrom required values corresponding to the car model code concerned, but in the case of handling new specifications not stored in the ROMs, the stored contents of the CPUs need to be rewritten. But such new specifications can easily be dealt with by prestoring the distance between the vehicle's height sensors 2 and 3 and their output characteristics in EEPROMs 83 and 89.

(8) With the signal line 10 merely kept to low-level for a predetermined time for initialization of the optical axis control, there is the possibility of an unexpected input being erroneously detected and determined. Such an input could be handled as a sure input by ANDing it with another input such as car body switch information. For example, when the high/low change-over switch 16 is actuated a predetermined number of times (for example, three times) while keeping the signal line 10 at the low level by using the signal of the switch 16, this repeated actuation is decided as an initial operation, by which the system can be made hard to malfunction.

Figure 5:
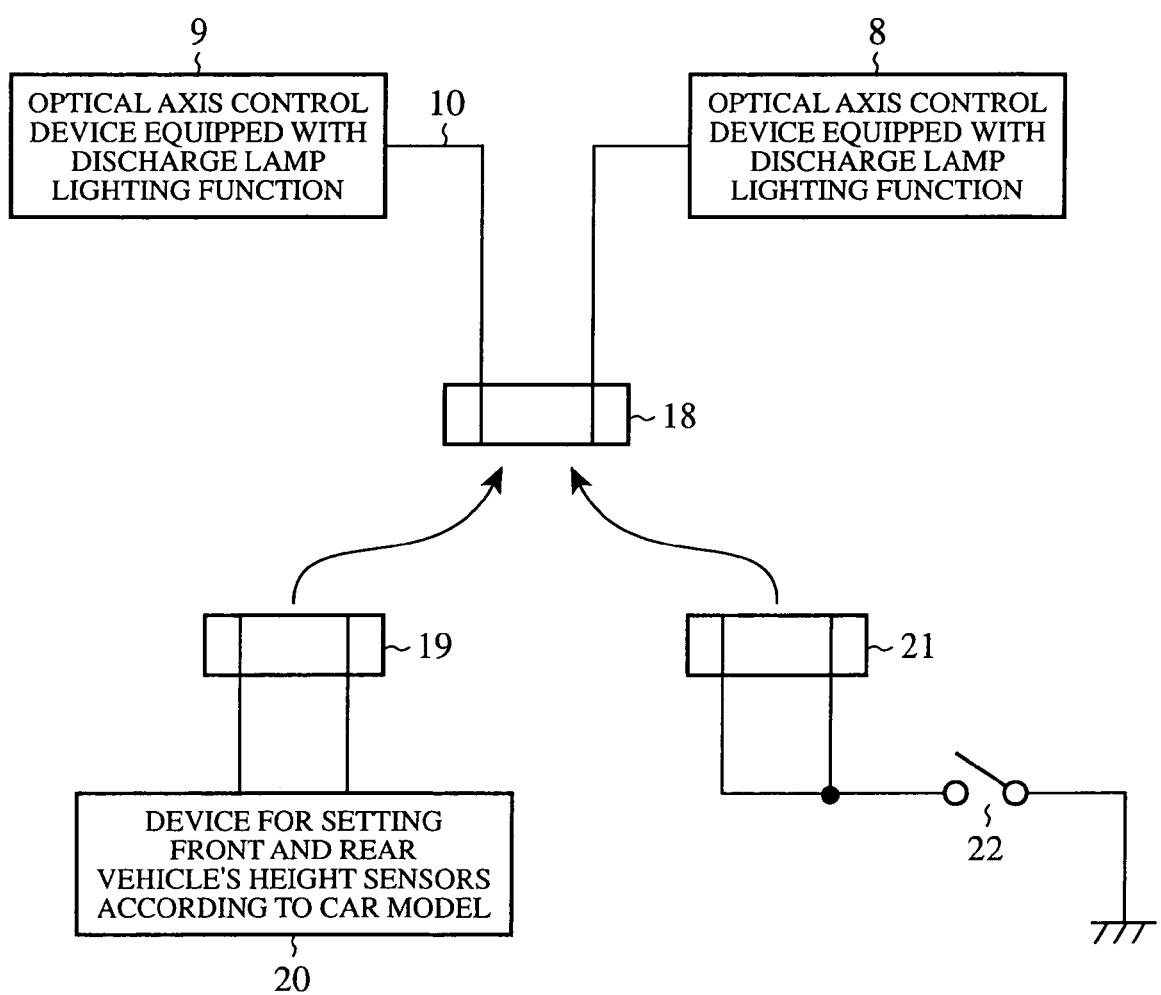
FIG. 5 is a schematic diagram showing the relationship between a signal line interconnecting the optical axis control devices and connectors.

(9) FIG. 5 schematically illustrates connections between the optical axis control devices 8 and 9 and connectors intended to use the single signal line 10 for setting of the right and left optical axis control devices 8 and 9 based on the car model concerned, for data communication between the optical axis control devices, and for their initialization. A connector 18 is connected to the signal line 10 intermediate between the optical axis control devices 8 and 9, and a connector 19 of a car model/front and rear sensor setting device 20 is connected to the connector 18. The sensor setting device 20 supplies via the connectors 18 and 19 to the optical axis control device 8 with information on the input thereto of the distance between the front and rear vehicle's height sensors 2 and 3 and the value of the vehicle's height of the front part of the car body and to the optical axis control device 9 with information on the input thereto of the distance between the front and rear vehicle's height sensors 2 and 3 and the value of the vehicle's height of the rear part of the car body.

By presetting which of the right and left optical control devices 8 and 9 receives the output signal from which of the front and rear vehicle's height sensors 2 and 3 as described above, it is possible to eliminate the need for preparing different optical axis control devices for right and left headlights, respectively; that is, optical axis control devices of exactly the same specifications can be used.

In FIG. 5, when a signal line connector 21 is connected to the connector 18 in place of the setting device 20, the optical axis control devices 8 and 9 exchange signals via the signal line connector 21. By keeping the signal line 21 low-level for a certain period of time, for example, for 3 to 5 seconds, while closing an initialization switch 22, it is possible to make the optical axis control devices 8 and 9 decide the operation as an initialization operation for bringing the optical axes back to the center (the solid-lined position in FIG. 3).

(10) The optical axis control devices 8 and 9 each monitor the operation of the other by mutual communications, and upon detection of an abnormal operation of the other device through a change in the information sent therefrom, the one device enters a fail-safe mode of operation to stop the optical axis control, keeping on the immediately preceding optical axis. This ensures prevention of erroneous optical axis control.

Figure 6:
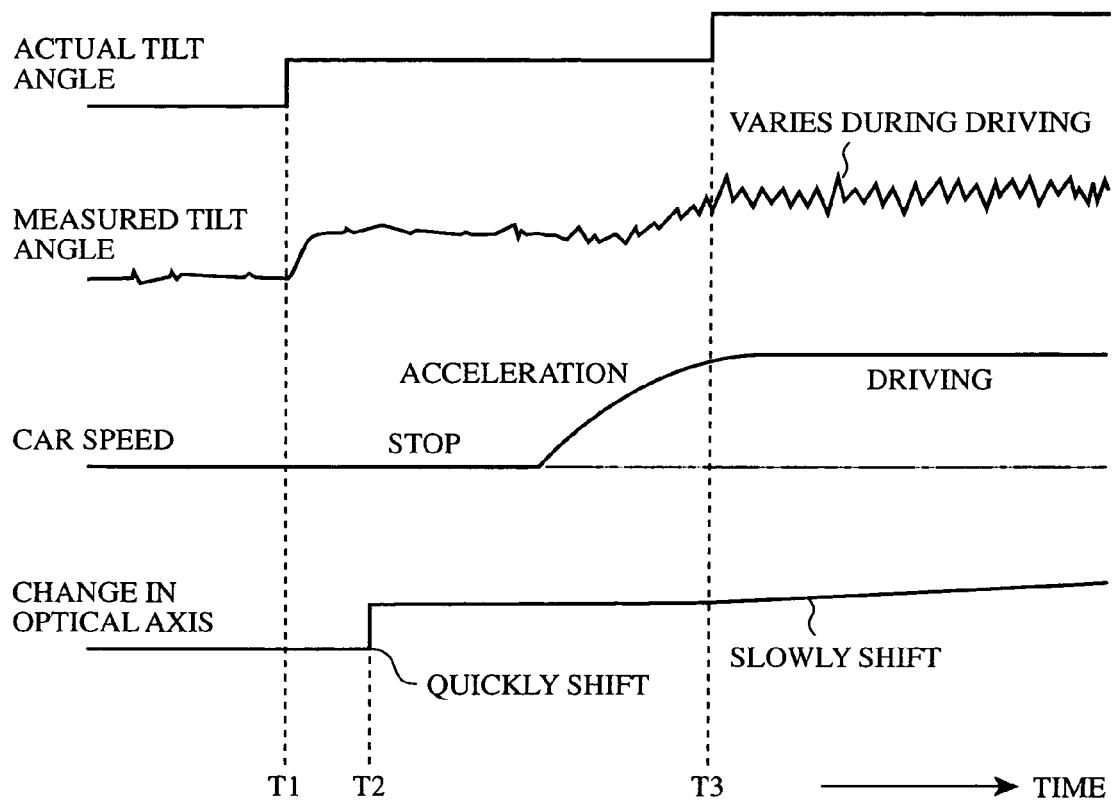
FIG. 6 is a timing diagram showing the relationship between a change in the tilt angle of the car body and the response for optical axis control.

(11) FIG. 6 is a timing chart showing the relationship between a change in the body tilt angle and the optical-axis control response thereto. The optical axis control devices 8 and 9 compute the measured tilt angle based on the information fed from the vehicle's height sensors 2 and 3, and based on the measured tilt angle they calculate the actual tilt angle at time T1. Based on the actual tilt angle, the optical axis control devices 8 and 9 each effect optical axis control of the headlamps, quickly changing the optical axis at time T2. As is evident from FIG. 6, during acceleration/deceleration of the body tilt angle varies from moment to moment; to prevent such variations in the body tilt angle from reflecting to the optical axis control of the headlamps, the prior art uses a car speed signal for detection control of the body tilt angle, but the use of the car speed signal requires a connector for receiving it, inevitably making the device configuration complex and bulky.

On the other hand, since the tilt angle changes every moment during acceleration/deceleration, determination of the change in the tilt angle could provide an indication of instability in the body tilt angle without the need for using the car speed signal. In view of this, according to the present invention, upon detection of the continuously measured tilt angle of the body 1 whose height becomes stable after acceleration/deceleration, the actual tilt angle at the time of detection (at time T3 in FIG. 6) is used to quickly shift the optical axis of each headlamp to an appropriate position. When the body tilt angle undergoes a substantial change, statistical processing for a long time is performed to effect gentle optical axis control.

Such nonuse of the car speed signal for the optical axis control permits reduction of the amount of wiring, the number of poles of each connector used and also permitting reduction of the amount of wiring throughout the car body, offering thereby optical axis control devices at lower cost.

Figure 7:
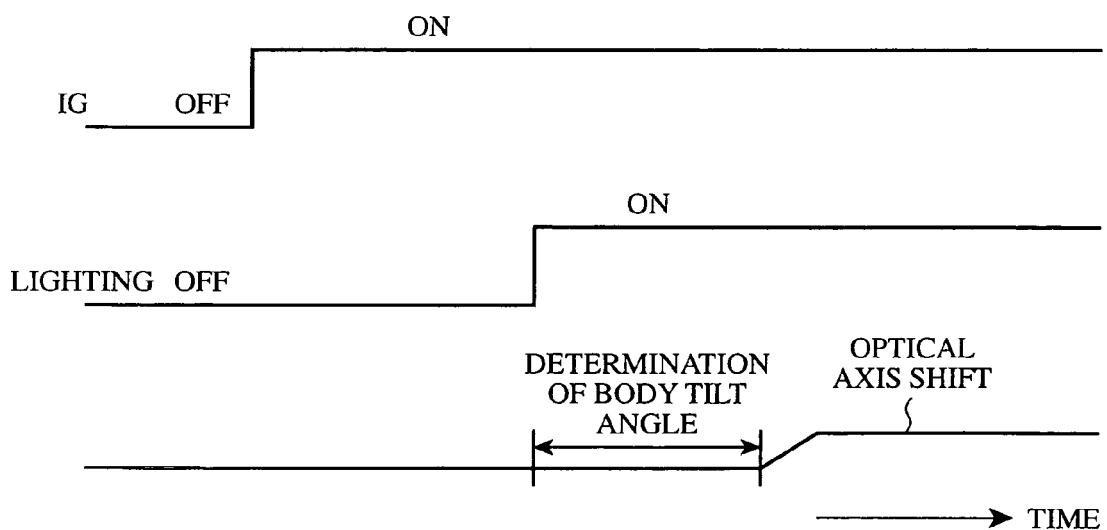
FIG. 7 is a diagram showing the timing for the decision of the body tilt angle.

(12) FIG. 7 is a timing diagram for detection of the body tilt angle. The optical axis control devices are each configured to operate on a headlamp lighting signal. That is, an IG (ignition) power supply is not used but a power supply for the headlamp (lighting switch) is used to actuate the optical axis control device. This eliminates the need for newly wiring the IG power supply near the headlamp, hence cutting the manufacturing costs of optical axis control devices.

With such an arrangement which does not include the IG power supply, it is impossible to obtain the ever-changing body tilt angle during the daytime driving without lighting the headlights; therefore, the optical axis cannot be shifted to a desired position simultaneously with lighting start of the headlamp. Since the optical axis control device is actuated by the above-mentioned lighting switch to detect the body tilt angle, the optical axis is controlled one beat behind, but such a short time lag does not matter in practice.

Embodiment 2

In Embodiment 1 described above the vehicle's height sensors 2 and 3 are disposed at the front and rear of the car body 1, but in a car of the type in which the force of the suspension spring disposed between the front axle and the car body is so strong that the height of the body at the front does not substantially change, the vehicle's height sensor 3 is disposed only in the rear of the car body, a fixed value is input as the vehicle's height value to the optical axis control device 8 in the front of the car, whereas the detected value by the vehicle's height sensor 3 in the rear of the car body is input to the rear optical axis control device 9. This embodiment also achieves the optical axis control as is the case with Embodiment 1.

Embodiment 3

With the discharge lamp lighting circuit incorporated in each optical axis control circuit as shown in FIG. 2, since the discharge lamp lighting function forms a part of the optical axis control function, the entire device structure can be made smaller and less expensive than in the case where the discharge lamp lighting circuit and the optical axis control device are provided separately.

In each of the embodiments described above, two optical axis control devices are used, but provision may be made to share information by three or more optical axis control devices.

What is claimed is:

1. An optical axis control device for controlling an optical axis of a first headlight comprising:
   a first interface operably connected to a first sensor and configured to receive a first signal from the first sensor, the first sensor being disposed at one of the front and rear of a vehicle, the first sensor being configured to measure a change in height of the vehicle body;
   a second interface operably connected to an additional optical axis control device that is disposed remotely relative to the optical axis control device, the additional optical axis control device being substantially identical to the optical axis control device, wherein the second interface is configured to:
      transmit a first information to the additional optical axis control device, the first information being representative of a first signal from the first sensor; and
      receive a second information from the additional optical axis control device, the received second information being representative of a second signal from a second sensor that is operably connected to the additional optical axis control device wherein the second sensor is disposed at the other of the front and rear of the vehicle, the second sensor being configured to measure a change in height of the vehicle body and to supply the second signal to the additional optical axis control device wherein the additional optical axis control device controls an optical axis of a second headlight;
   an actuator control unit configured to output a control signal to a levelizer actuator of the first headlight of the vehicle for controlling the optical axis of the first headlight based on the first signal from said first sensor and said second information received from the additional optical axis control device; and
   a lighting unit configured to light said first headlight.

2. The optical axis control device of claim 1, further comprising a storage device set with a fixed value representing a height at the front of the vehicle, wherein the control signal for controlling the optical axis of the first headlight is outputted based on the fixed value and either the first signal from the first sensor or the second information from the other optical axis control device.

3. The optical axis control device of claim 1, further being configured to detect a constant value associated with the first sensor, wherein a decision is made as to whether said first sensor is disposed at either the front or rear of the vehicle based on the detected constant value.

4. The optical axis control device of claim 1, further comprising a signal line supplied with values representing a distance between the first and second sensors, and output characteristics for at least one of the first and second sensors.

5. The optical axis control device of claim 1, wherein the second interface is supplied with a signal through a connector, the signal being commonly supplied with the other optical axis control device, the signal being used for performing an initialization of both optical axis control devices.

6. The optical axis control device of claim 1, further being configured to:
   detect an abnormality based on the second information received from the other optical axis control device, and enter a fail-safe operation upon detection of the abnormality.

7. A lighting system for a vehicle comprising:
   first and second optical axis control devices; and
   first and second headlights whose optical axes are controlled by the first and second optical axis control devices, respectively,
   wherein the first optical axis control device includes:
      a first interface configured to receive a first signal from a first sensor disposed at the front of the vehicle, the first sensor being configured to measure a change in height;
      a second interface configured to receive from the second optical axis control device information representative of a second signal from a second sensor that is disposed at the rear of the vehicle;
      a first actuator control unit configured to output a first control signal to a first levelizer actuator of the first headlight for controlling the optical axis of the first headlight light based on the first signal from said first sensor and said information received from the second optical axis control device; and
      a first lighting unit configured to light said first headlight, and wherein said second optical axis control device includes:
      a third interface configured to receive the second signal from said second sensor;
      a fourth interface configured to receive from the first optical axis control device information representative of the first signal from said first sensor;
      a second actuator control unit configured to output a second control signal to a levelizer actuator of the second headlight to control the optical axis of the second headlight based on the second signal from said second sensor and said information received from the first optical axis control device; and
      a second lighting unit configured to light said second headlight.

8. The lighting system of claim 7, wherein:
   the first optical axis control device further includes a first storage device set with a first fixed value representing a height at the front of the vehicle, the first optical axis control unit producing the first control signal based on the first fixed value and at least one of the first signal from the first sensor and the information received from the second optical axis control device, and the second optical axis control device further includes a second storage device set with a second fixed value representing a height at the rear of the vehicle, the second optical axis control unit producing the second control signal based on the second fixed value and at least one of the second signal of the second sensor and the information received from the first optical axis control device.

9. The lighting system of claim 7, wherein:

the first and second optical axis control units are configured to detect constant values associated with the first sensor and second sensors, respectively, wherein a decision is made as to whether at least one of said first and second sensors is disposed at the front or rear of the vehicle based on at least one of the detected constant values.

10. The lighting system of claim 7, wherein the first and second interfaces are connected via a signal line, the lighting system further comprising:

a connector for supplying the signal line with values representing a distance between the first and second sensors and output characteristics for at least one of the first and second sensors, the values being sent to at least one of the first and second optical axis control devices via the signal line.

11. The lighting system of claim 7, wherein the second interface is supplied with a signal through a connector, the signal being commonly supplied with the other optical axis control device, the signal being used for performing an initialization of both optical axis control devices.

12. The lighting system of claim 7, wherein each of the first and second optical axis control devices is configured to:

detect an abnormality based on the information received from the other of the first and second optical axis control devices, and enter a fail-safe operation upon detection of the abnormality.

* * * * *